(12) United States Patent
Watanabe et al.

(10) Patent No.: US 8,463,266 B2
(45) Date of Patent: Jun. 11, 2013

(54) CELL SELECTION METHOD, MOBILE STATION DEVICE AND MOBILE COMMUNICATION SYSTEM IN HIERARCHICAL CELL STRUCTURE

(75) Inventors: Keizo Watanabe, Kawasaki (JP); Hajime Hasegawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 779 days.

(21) Appl. No.: 12/343,994

(22) Filed: Dec. 24, 2008

(65) Prior Publication Data
US 2009/0117905 A1    May 7, 2009

(30) Foreign Application Priority Data
Jun. 29, 2006  (WO) .................... PCT/2006/313025

(51) Int. Cl.
*H04W 4/00* (2009.01)
(52) U.S. Cl.
USPC ......... 455/435.2; 455/436; 455/437; 455/443
(58) Field of Classification Search
USPC ................. 455/436, 442, 443, 444, 441, 425, 455/567, 434, 435.1, 435.2, 435.3; 370/329, 370/331
See application file for complete search history.

(56) References Cited

U.S. PATENT DOCUMENTS

| | | | |
|---|---|---|---|
| 6,546,251 | B1 | 4/2003 | Dalsgaard et al. |
| 2001/0031638 | A1 | 10/2001 | Korpela et al. |
| 2002/0102976 | A1 | 8/2002 | Newbury et al. |
| 2003/0045291 | A1 | 3/2003 | Watanabe |
| 2004/0053626 | A1* | 3/2004 | Yagi ........................ 455/456.1 |
| 2004/0162074 | A1* | 8/2004 | Chen .............................. 455/437 |
| 2006/0035662 | A1* | 2/2006 | Jeong et al. .................... 455/525 |
| 2006/0111108 | A1* | 5/2006 | Newbury et al. .............. 455/436 |
| 2006/0111110 | A1* | 5/2006 | Schwarz et al. ............... 455/439 |

FOREIGN PATENT DOCUMENTS

| | | |
|---|---|---|
| JP | 05063636 | 3/1993 |
| JP | 2002247633 | 8/2002 |
| JP | 2002525938 | 8/2002 |
| JP | 200370047 | 3/2003 |
| JP | 2003534675 | 11/2003 |
| JP | 2004088695 | 3/2004 |
| WO | 98/18281 | 4/1998 |

OTHER PUBLICATIONS

Notice of Rejection Grounds dated Feb. 15, 2011, from corresponding Japanese patent application No. 2008-522255.
First Office Action for the corresponding Chinese application No. 200680055163.3 dated Aug. 4, 2010.
Notice of Preliminary Rejection dated Oct. 21, 2010 for corresponding Korean application No. 10-2008-7030250.
International Search Report issued in International Application No. PCT/JP2006/313025 on Jul. 14, 2006.

* cited by examiner

*Primary Examiner* — Jean Gelin
(74) *Attorney, Agent, or Firm* — Smith, Gambrell & Russell, LLP

(57) ABSTRACT

In a radio mobile communication system adopting a hierarchical cell structure comprising a plurality of layers having respective cells of different sizes, the threshold value of the number of times of cell reselections and/or the threshold value of the time required to measure the number of times of cell reselections are set for each layer. A mobile station device compares the number of times of cell reselections in a specific time and/or the time required for the number of times of cell reselections to reach a specific value with the threshold values and selects a transfer target cell.

18 Claims, 27 Drawing Sheets

| Information Element /Group name | Need | Multi | Type and reference | Semantics description |
|---|---|---|---|---|
| Mapping Info | OP | | Mapping info | This IE should not be sent. |
| Cell selection and reselection quality measure | MP | | Enumerated (CPICH Ec/N0, CPICH RSCP) | Choice of measurement (CPICH Ec/N0 or CPICH RSCP) to use as quality measure Q for FDD cells. This IE is also sent to the UE in SIB11/12. Both occurrences of the IE should be set to the same value. |
| CHOICE mode | MP | | | |
| >FDD | | | | |
| >>$S_{intrasearch}$ | OP | | Integer (-32..20 by step of 2) | If a negative value is received the UE shall consider the value to be 0. [dB] |
| >>$S_{intersearch}$ | OP | | Integer (-32..20 by step of 2) | If a negative value is received the UE shall consider the value to be 0. [dB] |
| >>$S_{searchHCS}$ | OP | | Integer (-105..91 by step of 2) | If a negative value is received the UE shall consider the value to be 0. [dB] |
| >>RAT List | OP | 1 to <maxOtherRAT> | | |
| >>>RAT identifier | MP | | Enumerated (GSM, cdma2000) | |
| >>>$S_{search, RAT}$ | MP | | Integer (-32..20 by step of 2) | In case the value 20 is received the UE shall consider this IE as if it was absent according to If a negative value is received the UE shall consider the value to be 0. [dB] |
| >>>$S_{HCS, RAT}$ | OP | | Integer (-105..91 by step of 2) | If a negative value is received the UE shall consider the value to be 0. [4] [dB] |
| >>>$S_{limit, SearchRAT}$ | MP | | Integer (-32..20 by step of 2) | If a negative value is received the UE shall consider the value to be 0. [4] [dB] |

FIG. 2

| Information Element /Group name | Need | Multi | Type and reference | Semantics description |
|---|---|---|---|---|
| >>Qqualmin | MP | | Integer (−24..0) | Ec/N0, [dB] |
| >>Qrxlevmin | MP | | Integer (−115..−25 by step of 2) | RSCP, [dBm] |
| Qhyst1$_s$ | MP | | Integer (0..40 by step of 2) | [ [dB] |
| Qhyst2$_s$ | CV-FDD-Quality-Measure | | Integer (0..40 by step of 2) | Default value is Qhyst1$_s$ [dB] |
| Treselection$_s$ | MP | | Integer (0..31) | [s] |
| HCS Serving cell Information | OP | | HCS Serving cell information | |
| > HCS_PRIO | MD | | Integer (0···7) | EXISTING PARAMETER |
| > Q$_{hcs}$ | MD | | Q$_{hcs}$ | |
| > T$_{CRMAX}$ | MD | | Enumerated (not used, 30, 60, 120, 180, 240) | EXISTING PARAMETER [s] |
| > N$_{CR}$ | CV-UE speed detector | | Integer (1···16) | EXISTING PARAMETER [TIMES] |
| > T$_{CMAXHyst}$ | CV-UE speed detector | | Enumerated (not used, 10, 20, 30, 40, 50, 60, 70) | |
| Maximum allowed UL TX power | MP | | Maximum allowed UL TX power | [dBm] UE_TXPWR_MAX_RACH |

F I G. 3

| Information Element /Group name | Need | Multi | Type and reference | Semantics description |
|---|---|---|---|---|
| Qoffset1s,n | MD | | Integer (-50..50) | Default value is 0. [dB] |
| Qoffset2s,n | CV-FDD-Quality-Measure | | Integer (-50..50) | Default value is 0. [dB] |
| Maximum allowed UL TX power | MD | | Maximum allowed UL TX power | According to UE_TXPWR_MAX_RACH [dBm]. If applied to FDD or TDD cells, the default is the Maximum allowed UL TX power for the serving cell. If applied to a GSM cell, the default is the UE maximum output power applicable for this GSM cell, according to the UE's radio access capability. |
| 45 — HCS neighbouring cell information | OP | | HCS Neighbouring cell information | 0...7   (CURRENT ART) |
| CHOICE mode | MP | | | |
| >FDD | | | | |
| >>Qqualmin | CV-FDD-Serving-Cell | | Integer (-24..0) | Ec/N0, [dB] Default value is Qqualmin for the serving cell |
| >>Qrxlevmin | MD | | Integer (-115..-25 by step of 2) | RSCP, [dBm] Default value is Qrxlevmin for the serving cell |

F I G. 4

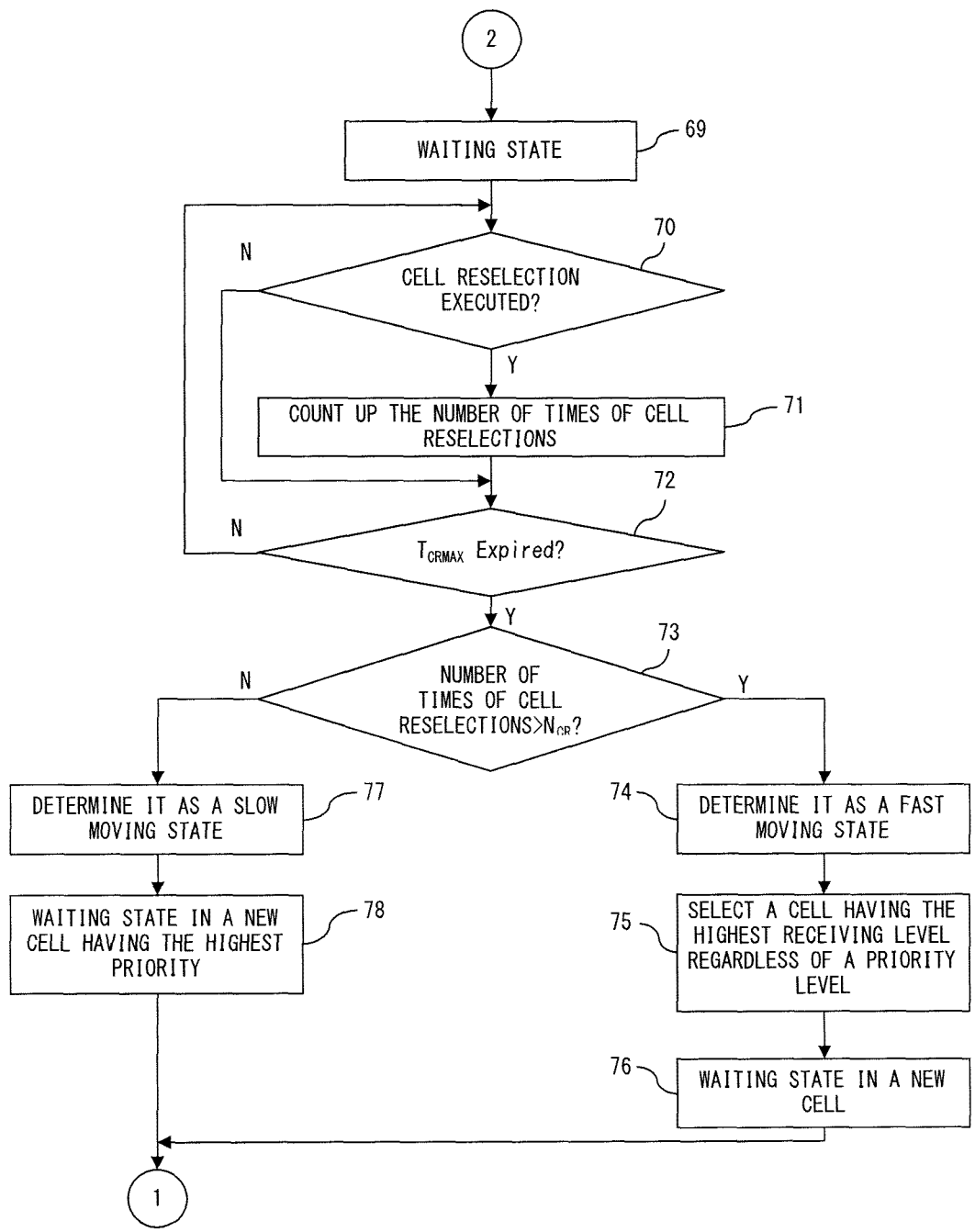
F I G. 6

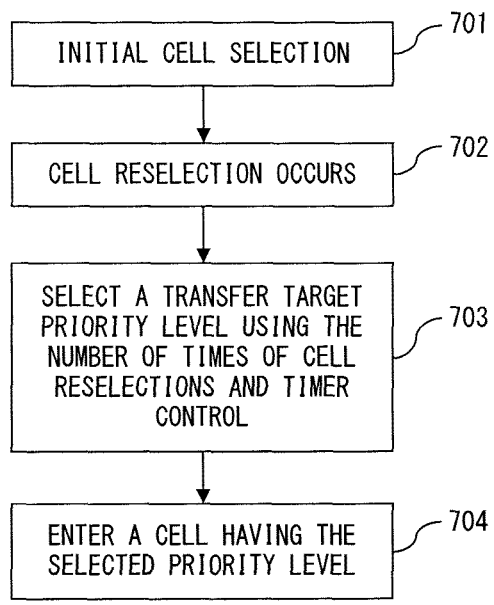
F I G. 7

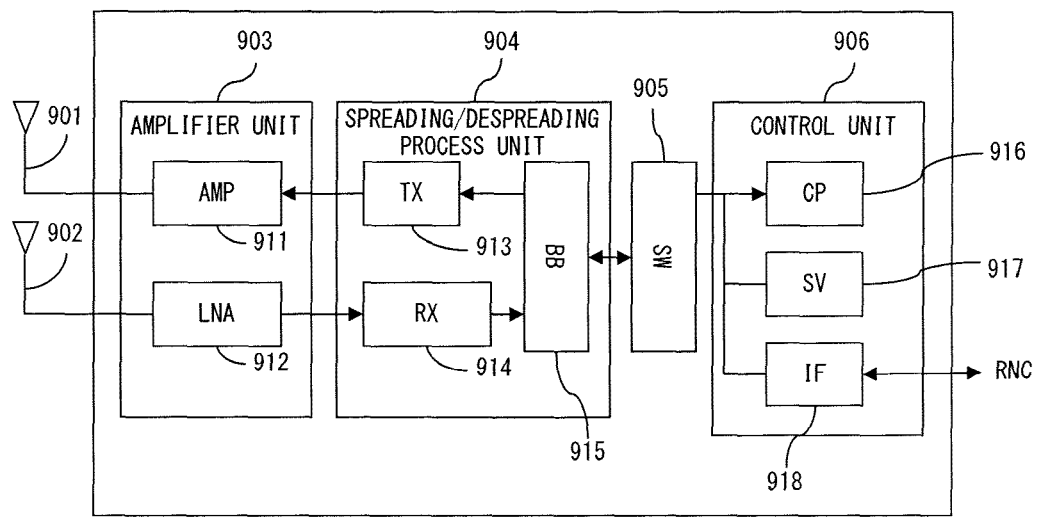
F I G. 9

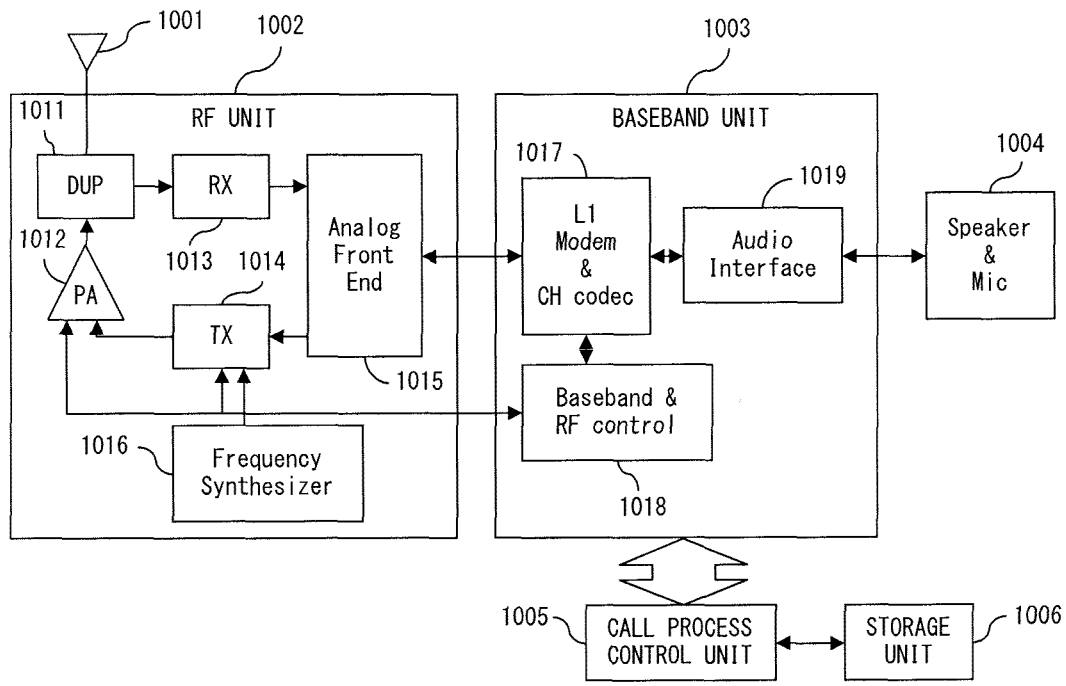
F I G. 10

| > HCS_PRIO | MD | Integer (0···7) | COMMENT |
|---|---|---|---|
| > $Q_{hcs}$ | MD | $Q_{hcs}$ | |
| > $T_{CRMAX}$ | MD | Enumerated (not used, 30, 60, 120, 180, 240) | [s] NUMERICAL VALUES DESCRIBED IN THE LEFT ARE EXAMPLES |
| > $N_{CR}-i$ | CV-UE speed detector | Integer (1······16) | NOTIFIED FOR EACH PRIORITY LEVEL (HCS_PRIO) [NUMBER OF TIMES] |

F I G. 1 1

| $N_{CR}$ | $N_{CR}$-0 | $N_{CR}$-1 | $N_{CR}$-2 | $N_{CR}$-3 | $N_{CR}$-4 | $N_{CR}$-5 | $N_{CR}$-6 | $N_{CR}$-7 |
|---|---|---|---|---|---|---|---|---|
| [NUMBER OF TIMES] | 15 | 12 | 10 | 8 | 6 | 4 | 2 | 0 |
| $T_{CRMAX}$ | 120 [SECONDS] ||||||||

F I G. 1 2

| TRANSFER TARGET PRIORITY LEVEL | MEASUREMENT TIME | NUMBER OF TIMES OF CELL RESELECTIONS |
|---|---|---|
| 0 | 120 | $15 \leq$ |
| 1 | 120 | 12, 13, 14 |
| 2 | 120 | 10, 11 |
| 3 | 120 | 8, 9 |
| 4 | 120 | 6, 7 |
| 5 | 120 | 4, 5 |
| 6 | 120 | 2, 3 |
| 7 | 120 | 0, 1 |

FIG. 13

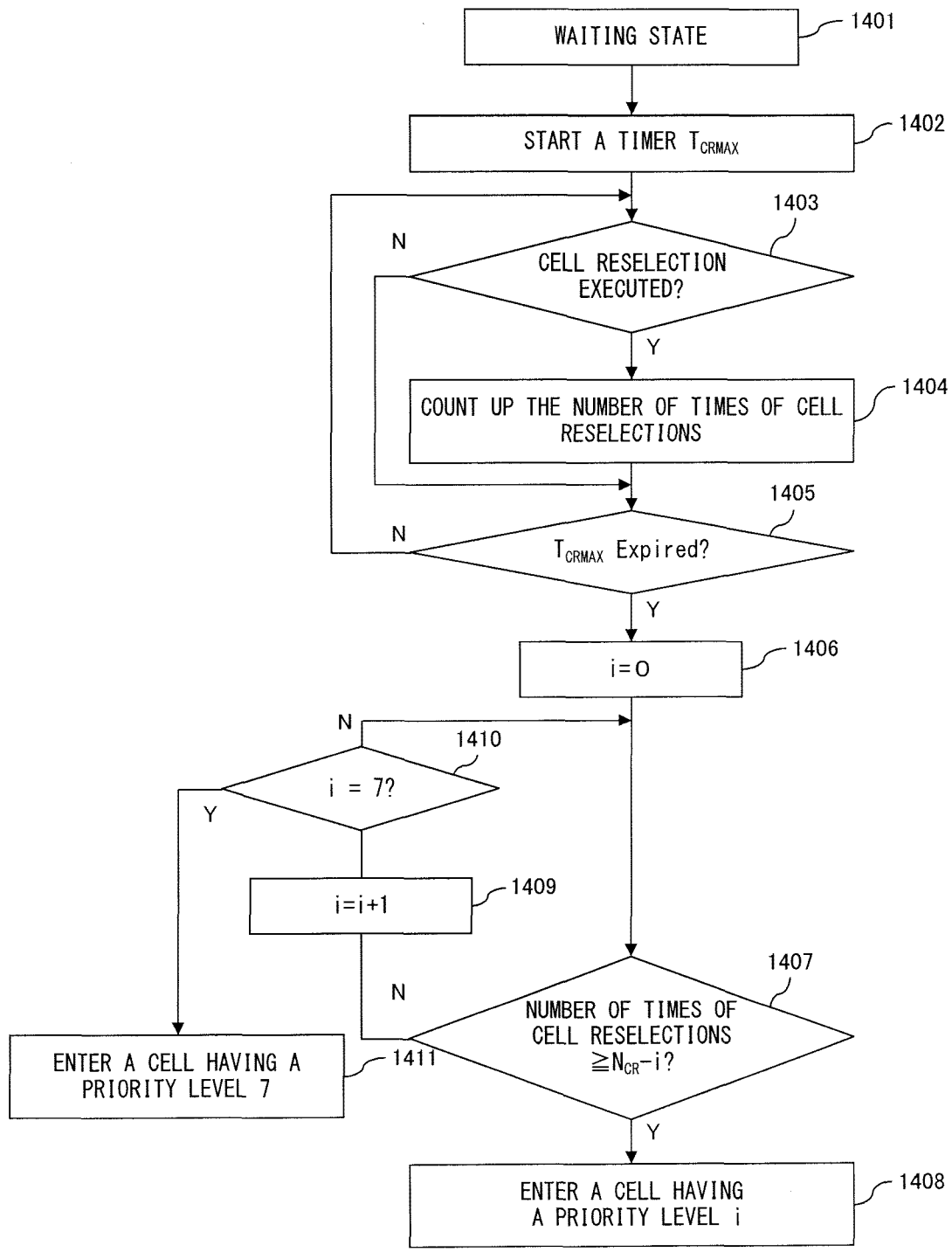
F I G. 14

| | | | |
|---|---|---|---|
| > HCS_PRIO | MD | Integer (0···7) | COMMENT |
| > $Q_{hcs}$ | MD | $Q_{hcs}$ | |
| > $T_{CRMAX}$ | MD | Enumerated | [s] |
| > $T_{CR}-i$ | MD | | NOTIFIED FOR EACH PRIORITY LEVEL (HCS_PRIO) [s] |
| > $N_{CR}$ | CV-UE speed detector | Integer (1···16) | COMMON TO EACH PRIORITY LEVEL [NUMBER OF TIMES] |

FIG. 15

| $T_{CR}$ | $T_{CR}$-0 | $T_{CR}$-1 | $T_{CR}$-2 | $T_{CR}$-3 | $T_{CR}$-4 | $T_{CR}$-5 | $T_{CR}$-6 | $T_{CR}$-7 |
|---|---|---|---|---|---|---|---|---|
| [SECOND] | 64 | 80 | 96 | 120 | 160 | 240 | 480 | ∞ |
| $N_{CR}$ | 8 [TIMES] ||||||||

F I G. 1 6

| TRANSFER TARGET PRIORITY LEVEL | MEASUREMENT TIME | NUMBER OF TIMES OF CELL RESELECTIONS |
|---|---|---|
| 0 | $0 < T \leq 64$ | 8 |
| 1 | $64 < T \leq 80$ | 8 |
| 2 | $80 < T \leq 96$ | 8 |
| 3 | $96 < T \leq 120$ | 8 |
| 4 | $120 < T \leq 160$ | 8 |
| 5 | $160 < T \leq 240$ | 8 |
| 6 | $240 < T \leq 480$ | 8 |
| 7 | $480 < T$ | 8 |

FIG. 17

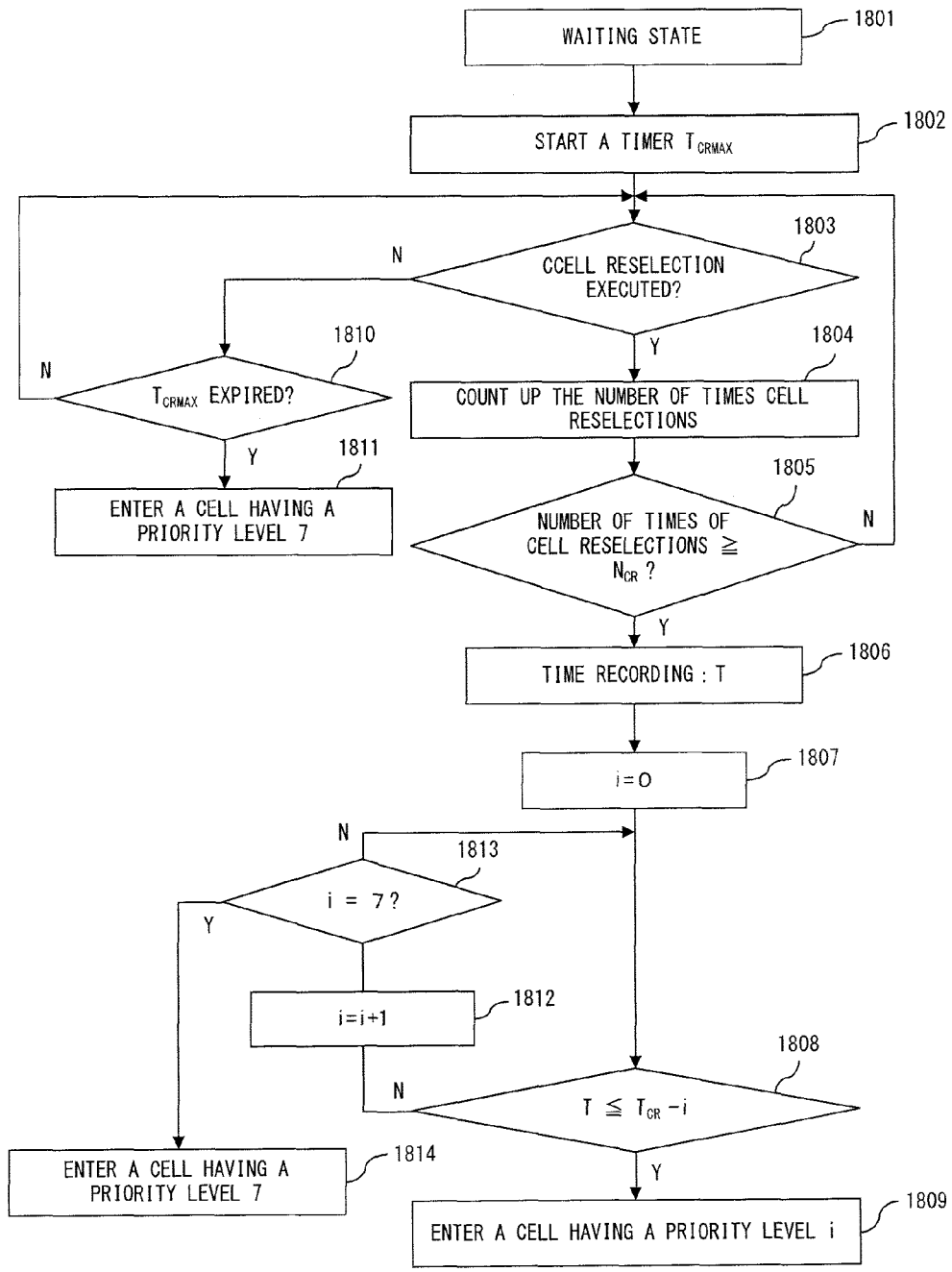
F I G. 1 8

| > HCS_PRIO | MD | Integer (0···7) | COMMENT |
|---|---|---|---|
| > $Q_{hcs}$ | MD | $Q_{hcs}$ | |
| > $T_{CRMAX}$ | MD | Enumerated | [s] |
| > $N_{CR}$ | CV-UE speed detector | Integer (1···16) | [NUMBER OF TIMES] |
| > $T_{CR}-1$ | MD | | BASE STATION INFORMATION FOR PRIORITY=1 [s] |
| > $N_{CR}-1$ | MD | | BASE STATION INFORMATION FOR PRIORITY=1 [NUMBER OF TIMES] |
| ⋮ | | ⋮ | omission |
| > $T_{CR}-4$ | MD | | BASE STATION INFORMATION FOR PRIORITY=4 [s] |
| > $N_{CR}-4$ | CV-UE speed detector | Integer (1···16) | BASE STATION INFORMATION FOR PRIORITY=4 [NUMBER OF TIMES] |
| > $T_{CR}-5$ | MD | | omission |
| > $N_{CR}-5$ | MD | | omission |
| ⋮ | | ⋮ | omission |
| $N_{CR}-7$ | MD | | Omission |

F I G. 1 9

| $T_{CR}$ | $T_{CR}$-0 | $T_{CR}$ -1 | $T_{CR}$ -2 | $T_{CR}$ -3 | $T_{CRMAX}$ | | | |
|---|---|---|---|---|---|---|---|---|
| [SECOND] | 64 | 80 | 96 | 120 | 120 | | | |
| $N_{CR}$ | $N_{CR}$ | | | | $N_{CR}$ -4 | $N_{CR}$ -5 | $N_{CR}$ -6 | $N_{CR}$ -7 |
| [NUMBER OF TIMES] | 8 | | | | 6 | 4 | 2 | 0 |

F I G. 2 0

| TRANSFER TARGET PRIORITY LEVEL | MEASUREMENT TIME | NUMBER OF TIMES OF CELL RESELECTIONS |
|---|---|---|
| 0 | $0 < T \leq 64$ | 8 |
| 1 | $64 < T \leq 80$ | |
| 2 | $80 < T \leq 96$ | |
| 3 | $96 < T \leq 120$ | |
| 4 | 120 | 6, 7 |
| 5 | | 4, 5 |
| 6 | | 2, 3 |
| 7 | | 0, 1 |

FIG. 21

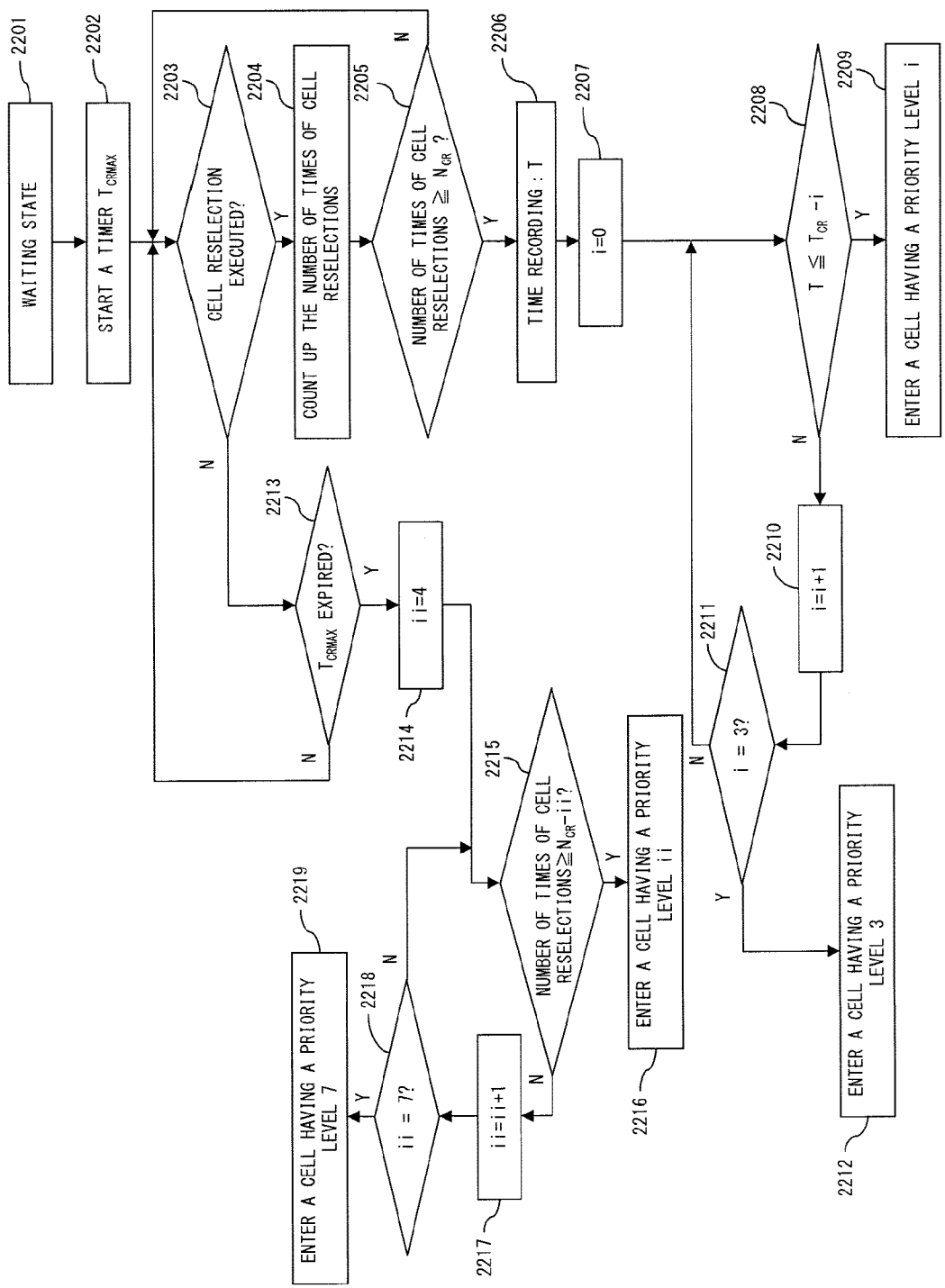
F I G. 22

| $N_{CR}$ | $N_{CR}$-0 | $N_{CR}$-1 | $N_{CR}$-2 | $N_{CR}$-3 | $N_{CR}$-4 | $N_{CR}$-5 | $N_{CR}$-6 | $N_{CR}$-7 |
|---|---|---|---|---|---|---|---|---|
| [NUMBER OF TIMES] | 15 | 12 | 10 | 8 | 6 | 4 | 2 | 0 |
| $T_{CRMAX}$ | 120 [SECONDS] ||||||||

FIG. 23

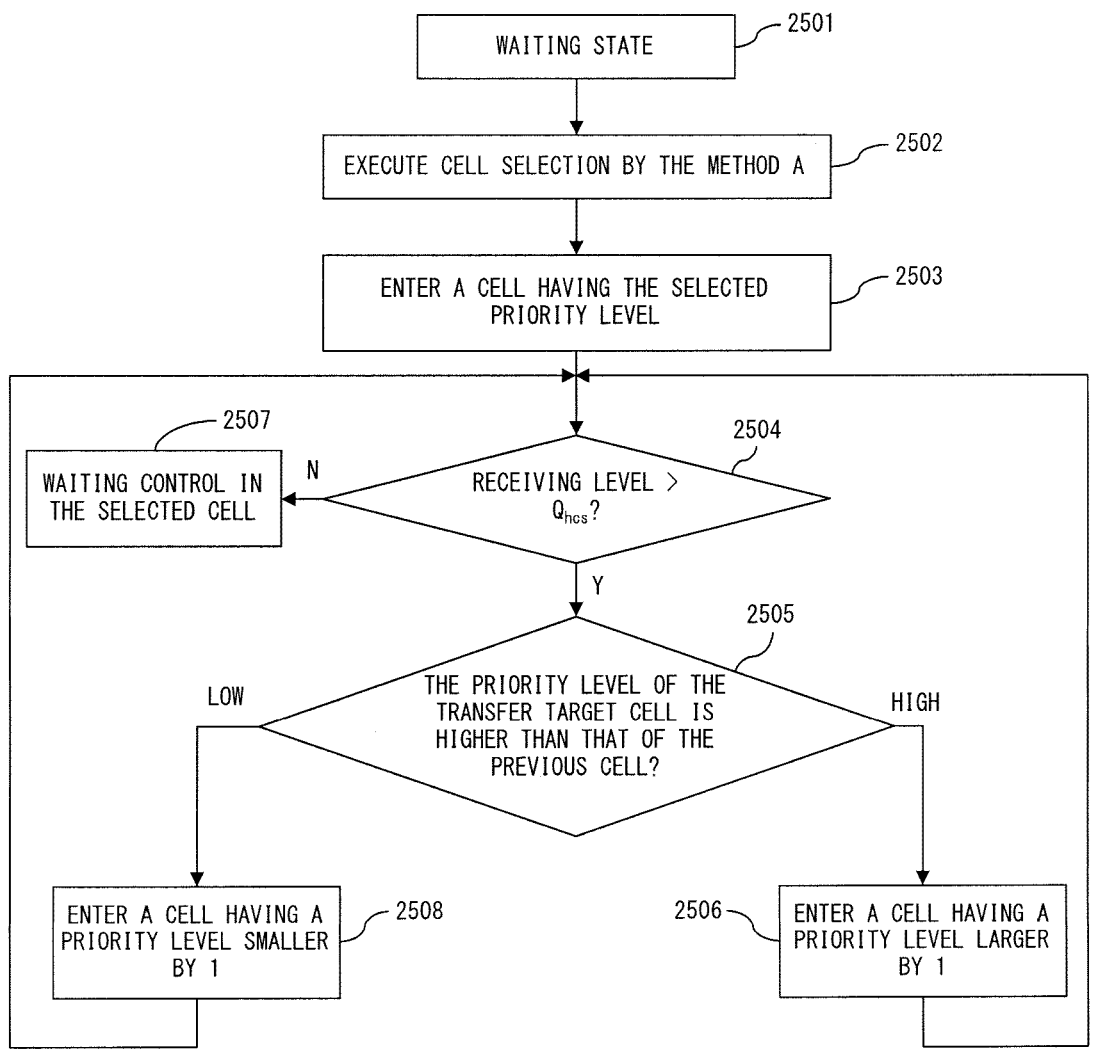
F I G. 2 5

| Information Element /Group name | Need | Type and reference | Semantics description |
|---|---|---|---|
| Qoffset1$_{s,n}$ | MD | Integer (−50..50) | Default value is 0. [dB] |
| Qoffset2$_{s,n}$ | CV-FDD-Quality-Measure | Integer (−50..50) | Default value is 0. [dB] |
| Maximum allowed UL TX power | MD | Maximum allowed UL TX power | |
| HCS neighbouring cell information | OP | HCS Neighbouring cell information | 0...7 (CURRENT ART) |
| 2601 ～ HCS_Cell_Change_Fault Rescue indicator for UP | | Not use, +1, +2, +3 | FOR PRIORITY UP AT THE TIME OF HCS CELL TRANSFER FAILURE |
| 2602 ～ HCS_Cell_Change_Fault Rescue indicator for Down | | Not use, −1, −2, −3 | FOR PRIORITY DOWN AT THE TIME OF HCS CELL TRANSFER FAILURE |
| CHOICE mode | MP | | |
| >FDD | | | |
| >>Qqualmin | CV-FDD-Serving-Cell | Integer (−24..0) | Ec/N0, [dB] Default value is Qqualmin for the serving cell |
| >>Qrxlevmin | MD | Integer (−115..−25 by step of 2) | RSCP, [dBm] Default value is Qrxlevmin for the serving cell |

F I G. 2 6

CELL SELECTION METHOD, MOBILE STATION DEVICE AND MOBILE COMMUNICATION SYSTEM IN HIERARCHICAL CELL STRUCTURE

CROSS REFERENCE TO RELATED APPLICATION

This application is a continuation of PCT application of PCT/JP2006/313025, which was filed on Jun. 29, 2006.

BACKGROUND OF THE INVENTION

1. Field of the Invention

The present invention relates to a mobile communication system using a hierarchical cell structure (HCS) technology, a cell selection method for selecting a visited cell in such a mobile communication system and a mobile station device therefor.

2. Description of the Related Art

As the demand on and traffic of a radio communication service have increased many technologies for increasing the capacity of a mobile communication system have been used. As one of them, an HCS technology is proposed and used.

For example, a cell structure using the HCS technology in a universal mobile telecommunications system (UMTS) is advised in TR25.304/922 of the third generation partnership project (3GPP) standard, the cell selection logic (at the time of an idle mode and an RRC connected mode) of a mobile station device visiting the HCS structure is described in details. In this specification, the summary of the part of it where the selection logic of user equipment (UE), such as a mobile station device, is defined is briefly described below with reference to this 3GPP standard.

As shown in FIG. 1, the HCS technology is a technology for forming a plurality of cells of cell shapes peculiar to a mobile communication system (a large cell, a small cell, a micro-cell, etc.) into a hierarchical structure. Roughly speaking, it is one object of the HCS technology to eliminate coverage holes and ensure a continuous area by overlapping a small cell on a large cell. As its example in use, it can be considered that by covering an area where traffic is concentrated by a small cell and regarding UE that visits the area as UE that visits the cell (small cell), system capacity can be increased and also a large cell can overlap it.

In the hierarchical structure shown in FIG. 1, the largest cell 11 includes the second largest cell 12 and the cell 12 includes the smallest cells 13 and 14. The cells 11, 12, 13 and 14 are formed by base stations 21, 22, 23 and 24, respectively, and UE 31 and 32 moves in this hierarchical cell structure.

As described above, in an area accompanying a multi-layer structure, it is desired that UE stays in a small cell as much as possible. However, for example, if there are too many numbers of cell selection since the moving speed of UE is too fast and the frequency of reselection is high, UE is made to visit a cell according to its receiving level (large cell) regardless of a cell hierarchy.

Generally, when a hierarchical cell structure is built using a large cell and a small cell, the receiving level of UE also differs due to a difference in the transmitting power of each base station. Generally, since the transmitting power of a base station having a large cell is set larger than that of a station having a small cell, accordingly radio waves from the large cell base station is received more strongly than radio waves from other base stations.

In FIG. 1, although UE in the cell 13 can receive radio waves from the stations 21, 22 and 23, the receiving level of radio waves from the base station 21 is highest, that of radio waves from the base station 22 is the second highest and that of radio waves from the base station 23 is lowest. The same applies to the receiving level in the cell 14.

In such a cell selection logic based on a receiving level, multilayered cells cannot effectively used simply by making a cell structure hierarchical. Therefore, in the HCS technology, waiting control (cell selection control) in an area having a multilayered cell structure can be performed by assigning priority to each cell and notifying UE of the priority information.

By increasing the number of base stations and radio channels for providing a service in a specific geographical area (around a concert hall, the downtown, a station, etc.) and intentionally controlling the connection destination of UE using this technology, the system capacity can be increased.

The above-described priority information can be assigned for each cell as "priority level" and reported from a UMTS terrestrial radio access network (UTRAN) to UE using the system information block of broadcast control channel (BCCH). The detailed information of the system information block of BCCH and the like are described in 3GPP TS25.331 v5.5.0 and after.

FIGS. 2 and 3 show the contents of system information block type 3/4 and FIG. 4 shows the contents of system information block type 11/12. In the idle mode, system information block type 3 or 11 is used.

The parameter 41 (HCS_PRIO) in the element 40 shown in FIG. 3 indicates a priority level and can be set in the numerical range of "0~7". According to the specification of 3GPP, the priority level can be defined as "HCS_PRIO" in the element 45 in system information block type 11/12 shown in FIG. 4. The larger the numerical value of the priority level, the higher the priority and the smaller the numerical value, the lower the priority. Generally, the priority of a large cell is set lower than that of a small cell.

In the hierarchical cell structure shown in FIG. 1, the cells 13 and 14 have the same priority, which is set higher than that of the cell 12. The priority of the cell 12 is set higher than that of the cell 11. Therefore, priority level of each base station is, for example, set as follows.

Base stations 23 and 24: 7
Base station 22: 4
Base station 21: 0

However, the relation among transmitting power of the base stations is as follows, as described above.
Base station 21>base station 22>base stations 23 and 24 In other words, the purpose of the priority control is to enable a cell selection according to the priority of each cell regardless of the height of the receiving level. For example, when UE 31 stays in the area of the cell 14, by giving higher priority to the small cell 14, the UE 31 can be made to visit the cell 14 having a low receiving level instead of the large cell 11 having a high receiving level.

It is an object of a mobile communication system having a hierarchical cell structure to provide low-speed/fixed UE with a service in the layer of a small cell. For example, it is preferable that the UE 31 shown in FIG. 1 visits the small cell 14 as much as possible.

However, if a service is provided for UE in the layer of a small cell when UE moves in high speed as when moves in a vehicle and so on, "cell reselection control" in which UE must reselect a visited cell will be repeated many times. In such a case, it is preferable to make it receive a service in the layer of a large cell.

In FIG. 1, a case where UE 32 in a vehicle moves from an area covered by only the large cell 11 to an area also covered by the small cell 14 in high speed is studied below. In this case, when the UE 32 moves between the small cells 13 and 14 in a short time from the relation between moving speed and an area size and when the UE 32 immediately moves to an area covered by only the large cell 11 again, it is desired that it visits the large cell 11.

In order to perform such control based on the moving speed of UE, the present HCS technology provides a mechanism for transferring UE to a large cell and reducing the number of cell reselection if UE moves in high speed even when UE must visit a small cell according to priority information.

In this mechanism, when detecting the moving speed of its own station, UE receives BCCH information (system information block) from UTRAN and obtains necessary information, such as the parameters 43 and 44 ($T_{CRMAX}$ and $N_{CR}$) shown in FIG. 3 and the like from various pieces of BCCH information. Then, if UE carries out a prescribed number $N_{CR}$ of times or less of "cell reselections" in a specific time $T_{CRMAX}$, UE determines that its own station is in a slow moving state, selects cells having the highest priority level from cells that satisfies required quality and further determines a large cell having the highest receiving level of them as a transfer target. If UE carries out more times than the prescribed number $N_{CR}$ of "cell reselections" in the specific time $T_{CRMAX}$, UE determines that its own station is in a fast moving state, selects a cell having the highest receiving level regardless of its priority level and is transferred to the cell from a small cell that has visited. Generally, a cell having the highest receiving level is a cell having a low priority level, that is, a large cell.

FIGS. 5 and 6 is the flowchart of such a cell selecting operation. When the power is switched on (step 51), firstly, cell information stored before the power is switched off is checked (steps 52 and 53). If there is cell information, a cell is searched for on the basis of the information (step 54) and it is checked whether cells having a receiving level more than a prescribed one (threshold level) have been detected (step 55).

If cells having a receiving level more than a threshold level are detected, a cell having the highest receiving level is selected from those cells, receives a system information block (SIB) (step 56) and the initial cell selection is completed (step 57).

If in step 53 there is no cell information, initial cell search control (3GPP TS25.304) is executed (step 64) and it is checked whether cells having a receiving level more than a threshold level have been detected (step 65). If cells having a receiving level more than a threshold level are detected, a cell having the highest receiving level is selected from those cells, a system information block (SIB) is received (step 66) and the initial cell selection is completed (step 57). If in steps 55 and 65 no cell having a receiving level more than a threshold level is detected, the operation in step 64 is performed.

After the initial cell selection is completed, then it is checked whether the received SIB (type 3 or 11) includes HCS information (step 58). This HCS information corresponds to the element 40 shown in FIG. 3 or the element 45 shown in FIG. 4.

If the SIB includes HCS information, its receiving level is measured on the basis of the information (step 59) and the measured receiving level is compared with the threshold value $Q_{hcs}$ included in the SIB (step 60). In the SIB shown in FIG. 3, $Q_{hcs}$ corresponds to the parameter 42 in the element 40 and in the SIB shown in FIG. 4, $Q_{hcs}$ is described in the element 45.

If there are cells whose receiving levels are equal to or more than $Q_{hcs}$, the priority levels of those cells is checked (step 61) and a cell having the highest priority and the highest receiving level (step 62) is selected. Then, a timer for measuring specific time $T_{CRMAX}$ is activated, the count of the number of times of cell reselections is started (step 63). Then, UE enters a waiting state (step 69).

If in step 58 the SIB includes no HCS information, waiting control (3GPP TS25.304) in a structure other than HCS (step 67) is performed. If in step 60 the receiving level is less than $Q_{hcs}$ too, waiting control (3GPP TS25.304) in a structure other than HCS is performed (step 68).

After UE entering a waiting state, it is checked whether cell reselection has been executed (step 70) and the number of times of cell reselections is counted up every time cell reselection is executed (step 71). Then, the count-up of the number of times of cell reselections is repeated until the timer value reaches $T_{CRMAX}$ (step 72).

When the timer value reaches $T_{CRMAX}$, the number of times of cell reselections is compared with $N_{CR}$ (step 73). If the number of times of cell reselections is more than $N_{CR}$, it is determined that its own station is in a fast moving state (step 74). Then, a cell having the highest receiving level is selected regardless of its priority level (step 75), UE enters the waiting state in the cell (step 76) and the operations in step 58 and after are performed.

If the number of times of cell reselections is equal to or less than $N_{CR}$, it is determined that its own station in a slow moving state (step 77). Then, a cell having the highest priority level is elected, UE enters a waiting state in the cell (step 78) and the operations in step 58 and after are performed.

For example, when building the three-layer cell structure as shown in FIG. 1, it is designed in such a way that any cell may have almost the same number of UE regardless of its size, in a system design concept. However, since according to the present HCS algorism, there are only two ways of fast movement and slow movement as the criteria of cell reselection, only the largest cell 11 (at the time of intermediate/fast movement) or the smallest cell 13 or 14 (priority control at the time of slow movement) can be selected. Therefore, even when UE is desired to visit an intermediate cell 12, it cannot visit the cell 12.

If UE moves in too small a cell in high speed, its battery consumption increases and its continuous waiting time decreases, since cell reselection must be repeated. If UE moves through too large a cell in low speed too, its battery consumption increases since it must communicate with the base station of a large cell at the time of calling and location registration. Furthermore, in that case, since the load of traffic cannot be appropriately distributed, the load of a large cell becomes heavy beyond its design value.

The following Patent Document 1 relates to cell reselection in a mobile communication system having a hierarchical cell structure and Patent Documents 2 and 3 relate to cell reselection in a mobile communication system having an ordinary cell structure.

Patent Document 1: Japanese Translation of PCT International Patent Application Publication No. 2003-534675
Patent Document 2: Japanese Translation of PCT International Patent Application Publication No. 2002-525938
Patent Document 3: Japanese Patent Application Publication No. 2003-070047

SUMMARY OF THE INVENTION

It is an object of the present invention to make each mobile station device visit a cell of an appropriate size according to its moving speed and a cell structure in a radio mobile communication system adopting a hierarchical cell structure consisting of a plurality of layers having respective cells of different sizes.

In the first mobile station device of the present invention, a storage unit stores a plurality of the threshold values of the number of times of cell reselections set for each of a plurality of layers. A control unit measures the number of times of cell reselections executed in a specific time, compares the obtained number of times of cell reselections with each of the plurality of threshold values, determines a layer suitable for its moving speed and selects a cell which belongs to the determined layer as a transfer target.

In the second mobile station device of the present invention, a storage unit stores a plurality of the threshold values of the measurement time for the number of times of cell reselections set for each of a plurality of layers. A control unit measures a time required for the number of times of cell reselections to reach a specific value, compares the obtained required time with each of the plurality of threshold values, determines a layer suitable for its moving speed and selects a cell which belongs to the determined layer as a transfer target.

According to the first and second mobile station devices, since cell transfer conditions are determined using a plurality of threshold values corresponding to each of a plurality of layers, a cell having a suitable size according to its moving speed and a cell structure can be selected as a transfer target.

BRIEF DESCRIPTION OF THE DRAWINGS

FIG. 2 shows system information block type 3/4 (No. 1)
FIG. 3 shows system information block type 3/4 (No. 2).
FIG. 4 shows system information block type 11/12.
FIG. 6 is the flowchart of the conventional cell selecting operation (No. 2).
FIG. 7 is the flowchart of the cell selecting operation of the present invention.
FIG. 9 shows the configuration of a base station device.
FIG. 10 shows the configuration of a mobile station device.
FIG. 11 shows a system information block in a method A.
FIG. 12 shows parameters in the method A.
FIG. 13 shows cell transfer conditions in the method A.
FIG. 14 is the flowchart of a cell selecting operation by the method A.
FIG. 15 shows a system information block in a method B.
FIG. 16 shows parameters in the method B.
FIG. 17 shows cell transfer conditions in the method B.
FIG. 18 is the flowchart of a cell selecting operation by the method B.
FIG. 19 shows a system information block in a method C.
FIG. 20 shows parameters in the method C.
FIG. 21 shows cell transfer conditions in the method C.
FIG. 22 is the flowchart of a cell selecting operation by the method C.
FIG. 23 shows parameters in a method D.
FIG. 25 is the flowchart of a re-transfer process by a method E.
FIG. 26 shows a system information block in a method F.

DESCRIPTION OF THE PREFERRED EMBODIMENTS

The detailed best mode for carrying out the present invention is described below with reference to the drawings.

This preferred embodiment adopts a higher-accuracy moving speed determination method than the prior art. All information ($T_{CRMAX}$ and $N_{CR}$) needed for UE to determine its moving state and all parameters needed to select a transfer target (peripheral cell information) are reported from UTRAN to the UE using the annunciation information (BCCH) shown in FIGS. 2-4, like a priority level.

Then, by providing a plurality of pieces of cell selection logic and cell transfer control in UE, in a mobile communication system having a hierarchical cell structure, UE can select a cell according to the moving state of its own station.

Figure 5:
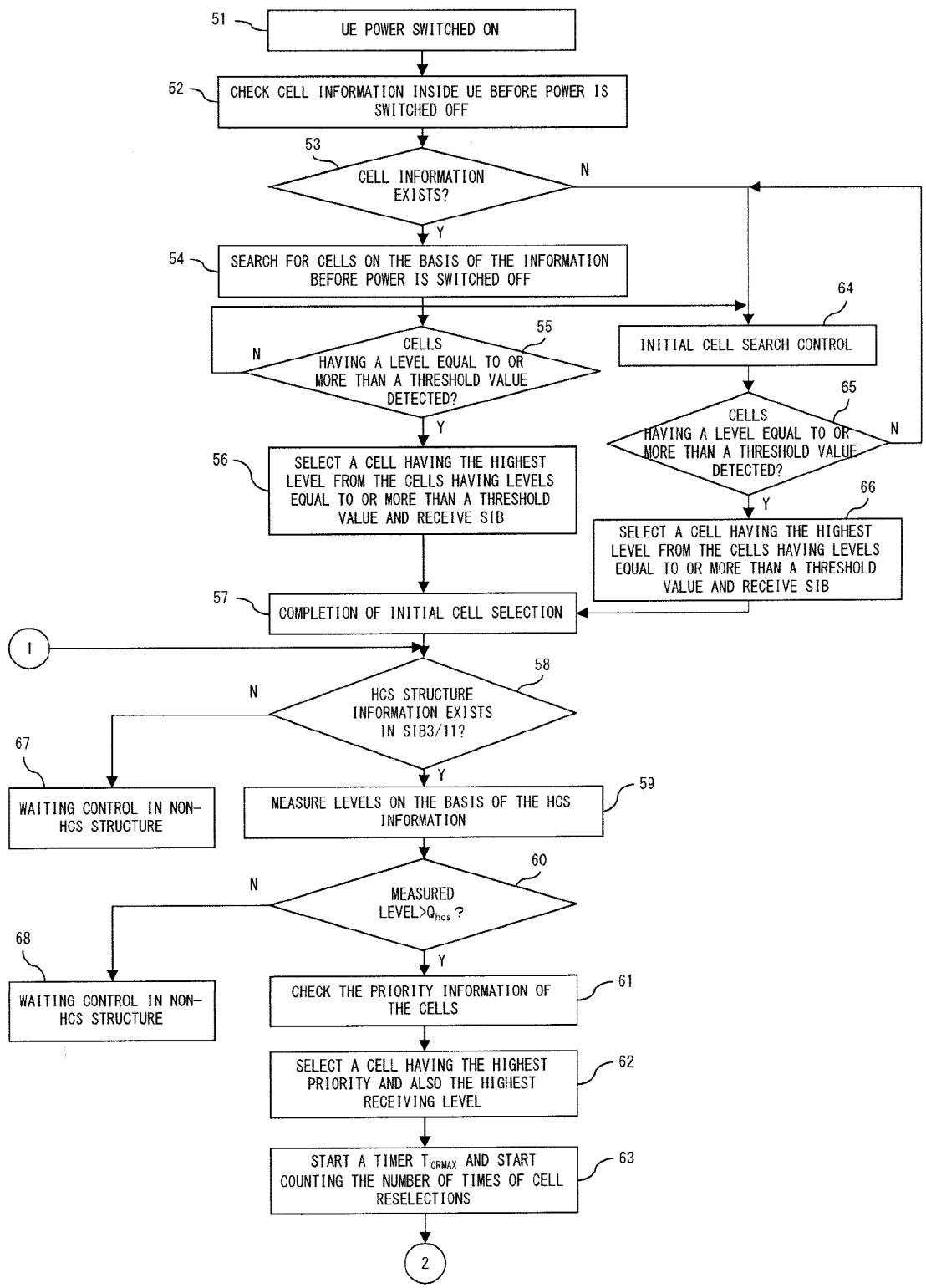
FIG. 5 is the flowchart of the conventional cell selecting operation (No. 1).

FIG. 7 is the flowchart of the cell selecting operation in this preferred embodiment. Firstly, initial cell selection as in FIG. 5 is executed (step 701). When cell reselection occurs in a waiting state (step 702), the priority level of a transfer target is selected on the basis of the number of times of cell reselections and a timer value (step 703). Then, UE enters a cell having the selected priority level (step 704). Thus, each UE can select a cell suitable for it from cells having many priority levels.

The basic principles of four types of transfer target selecting methods A-D used in the cell selecting operation shown in FIG. 7 and two types of reselection methods E and F used when the cell transfer fails are described below.

(1) Method A

The same cell selection logic is adopted regardless of whether a cell transfer direction is a large cell>a small cell or a small cell>a large cell. Measurement time $T_{CRMAX}$ reported by BCCH is specified as a fixed value which does not depend on a priority level and the threshold value $N_{CR}$ of the number of times of cell reselections is specified for each priority level, which are used as the criteria of determining a transfer target.

According to this method, UE can select a transfer target priority level from a plurality of priority levels on the basis of the size of the number of times of cell reselections executed in a specific measurement time and enter a cell having the priority level.

(2) Method B

The same cell selection logic is adopted regardless of a cell transfer direction. Measurement time $T_{CRMAX}$ reported by BCCH is specified as a fixed value which does not depend on a priority level and the threshold value $N_{CR}$ of the number of times of cell reselections is specified for each priority level, which are used as the criteria of determining a transfer target.

According to this method, UE can select a transfer target priority level from a plurality of priority levels by the length of time required to reach a prescribed number of times of cell reselections and enter a cell having the priority level.

(3) Method C

If a cell transfer direction is a large cell>a small cell when viewed from the UE side, the cell selection logic of the method A is adopted. If a cell transfer direction is a small cell>a large cell when viewed from a UE side, the cell selection logic of the method B is adopted. For example, if UE that visits a cell having a priority level 4 enters a cell having a priority level "5", "6" or "7" when there are priority levels of "0"~"7", the method A is used. If the UE enters a cell having a priority level of "3", "2", "1" or "0", the method B is used.

If UE is transferred from a small cell to a large cell, it is preferable to transfer it when the number of times of cell reselections has exceeded its threshold value without waiting the termination of the measurement time in order to prevent the increase of the number of times of cell reselections in UE and the consumption of battery. Therefore, the method B by which the measurement time is shortened is used. However, unless the count result of the number of times of cell reselections is awaited until the measurement time terminates when UE is transferred from a large cell to a small cell, the UE cannot determine a transfer target priority. Therefore, the method A is adopted.

(4) Method D

For the information reported by BCCH, the same information as in the method A is used regardless of a cell transfer direction. Even when receiving the same information as in the method A, UE can adopt the same cell selection logic of not only the method A but also the method C. If adopting the latter cell selection logic, calculation necessary for cell selection logic is executed on the UE side on the basis of received BCCH information.

In order to perform the same operation as the method C using the BCCH information of the method A, UE must calculate a cell reselection occurrence average time using the reported measurement time $T_{CRMAX}$ and threshold value $N_{CR}$ of the number of times of cell reselections and determine a transfer target priority level on the basis of the average time. This is the largest different point from the other methods A~C.

According to this method, UE that visits an area where the same BCCH information as a method is reported can also select a cell using the method A according to the state of its own station and also select a cell using a different method as the method D.

(5) Method E

If a transfer target cell does not satisfy the required receiving level at the waiting time of UE due to some cause when the UE has selected the transfer target cell and entered the cell (at the time of cell transfer failure), the UE enters another cell again as its recovery means. In this method, UE modifies the transfer target to a cell having the closest (high/low) priority level to the determination result immediately before the cell transfer, which is owned by its own station and performs a re-transfer process.

(6) Method F

When failing in cell transfer in each of the above-described methods A-D, UE carries out the re-transfer to another cell. In this method, the UE modifies the transfer target to a cell having a priority level that is away by a prescribed value from the immediately before determination result on the basis of cell reselection priority information at the time of the cell transfer failure, which is in advance reported by BCCH information and performs a re-transfer process.

Figure 1:
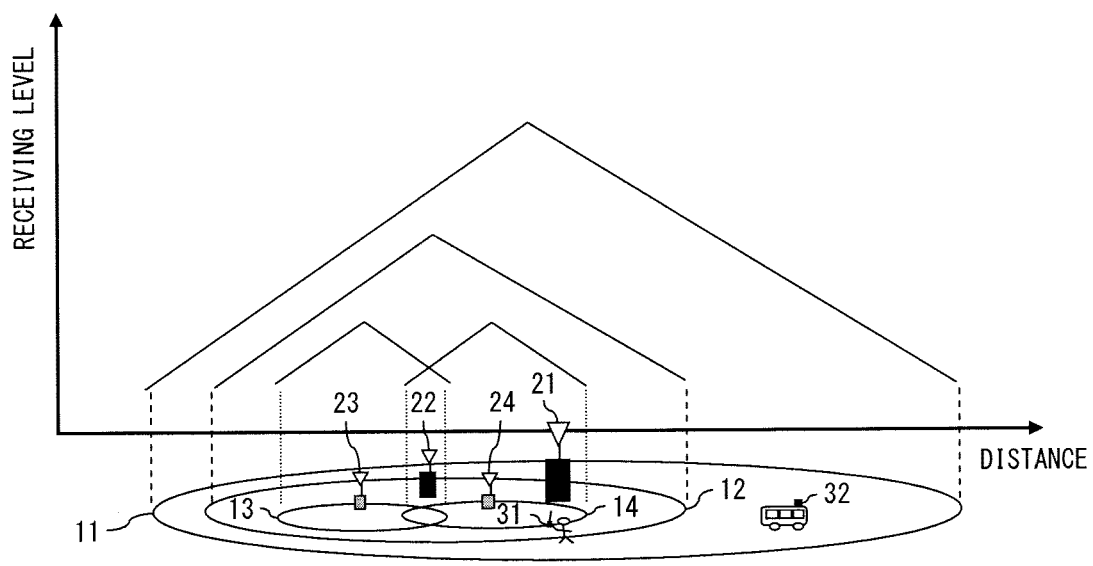
FIG. 1 shows a hierarchical cell structure.

According to the above-described methods A~F, even in a system having the three-layer cell structure shown in FIG. 1 or a hierarchical cell structure having the number more than that, the cell reselection method of UE can be improved and UE that is effective in visiting an intermediate cell 12 can enter a waiting state for the sector of the base station 22. When UE moves in a small cell in high speed, the phenomenon in which cell reselection is repeated can be reduced and as a result, the battery consumption of UE can be suppressed.

Furthermore, when viewed from the system building side (an operator, etc.), cell selection logic can be adopted according to its objective from the viewpoint of traffic load distribution. Therefore, a system in which the HCS technology can be more efficiently used can be provided.

Although the above-described background technologies and the following preferred embodiments are described on the basis of International Mobile Telecommunications 2000 (IMT 2000) in order to show their detailed operations and the like, the present invention can be widely applied to a mobile communication system having a hierarchical cell structure and its application range is not limited to IMT 2000.

Next, the configurations of the base station control device (RNC), the base station device (BTS) and the mobile station device (UE) are described with reference to FIGS. 8 to 10.

Figure 8:
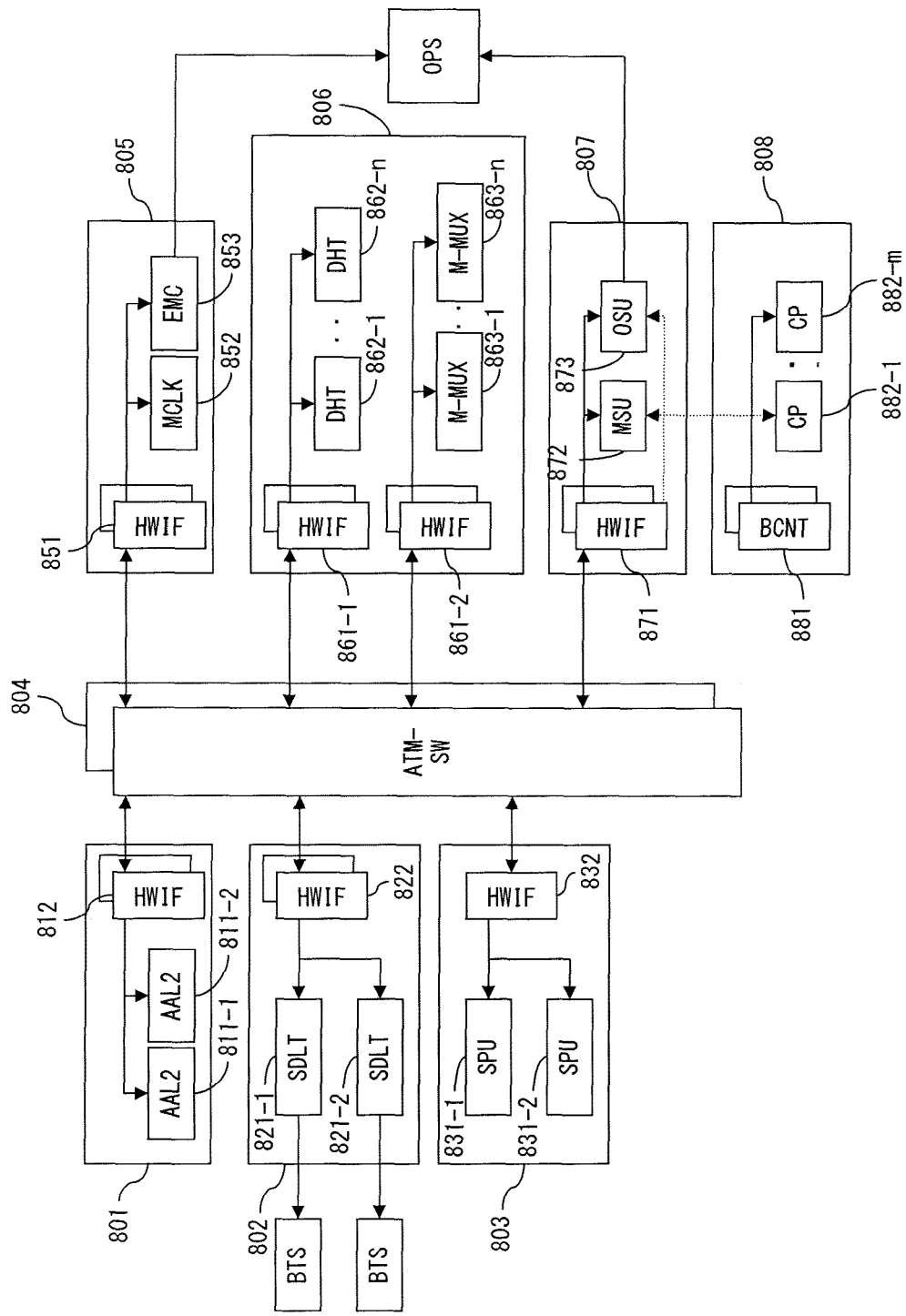
FIG. 8 shows the configuration of a base station control device.

FIG. 8 shows an example of the configuration of the base station control device. This base station control device comprises processing units 801, 803 and 806, an interface unit 802, a switch unit (ATM-SW) 804, control units 805 and 808 and a termination unit 807 and controls a plurality of base station devices.

The processing unit 801 includes an ATM adaptation layer 2 (AAL2) processing units 811-1 and 811-2 and a transmission line interface unit (HWIF) 812. The AAL2 processing units 811-1 and 811-2 perform the multiplexing/demultiplexing process of AAL2.

The interface unit 802 includes transmission line interfaces 821-1(SDLT), 821-2(SDLT) and 822 (HWIF). The transmission line interfaces 821-1(SDLT) and 821-2(SDLT) terminates an Iub line between a BTS and an RNC.

The processing unit 803 includes a packet data processing units 831-1(SPU) and 831-2(SPU) and a transmission line interface unit (HWIF) 832. The packet data processing units 831-1 (SPU) and 831-2(SPU) process packet data.

The switch unit 804 performs switching of an asynchronous transfer mode (ATM).

The control unit 805 includes a transmission line interface unit (HWIF) 851, a radio frame clock generation unit (MCLK) 852 and an emergency control unit (EMC) 853. The radio frame clock generation unit 852 generates an intra-device reference clock signal and the emergency control unit (EMC) 853 monitors and controls the abnormality of a device state.

The processing unit 806 includes transmission line interface units (HWIF) 861-1 and 861-2, diversity hand-over trunk units (DHT) 862-1 though 862-n and media access control (MAC) multiplexing/demultiplexing units (M-MUX) 862-1~862-n. The diversity hand-over trunk units 862-1~862-n perform diversity hand-over process and the MAC multiplexing/demultiplexing units 862-1~862-n perform the MAC layer multiplexing/demultiplexing process of a radio line.

The termination unit 807 includes a transmission line interface unit (HWIF) 871, a mobile station opposing signal termination unit (MSU) 872 and an operation system (OPS) opposing signal termination unit (OSU) 873 and terminates the control signals for a call process and the like.

The control unit 808 includes a bus control unit (BCONT) 881 and call process control units (CP) 882-1~882-m. The call process control units 882-1~882-m performs call establishment control, mobility control and the like. Each call process control unit 882 comprises an HCS parameter specification unit, and generates an SIB including HCS parameters and notifies UE of it via a BTS.

FIG. 9 shows an example of the configuration of a base station device. This base station device comprises a transmitting antenna 901, a receiving antenna 902, an amplifier unit 903, a spreading/despreading process unit 904, a switch unit (SW) 905 and a control unit 906.

The amplifier unit 903 includes a transmitting amplifier (AMP) 911 and a receiving low-noise amplifier (LNA) 912. The spreading/despreading process unit 904 includes a transmitter (TX) 913, a receiver (RX) 914 and a baseband unit (BB) 915.

A signal transmitted from UE is received by the receiving antenna 902 and amplified by the amplifier 912. Then, the signal is transferred to the control unit 906 via the receiver 914, the baseband unit 915 and the switch unit 905. In this case, the receiver 914 performs the detection of the received signal and analog-to-digital (A/D) conversion. The baseband unit 915 performs a baseband signal process, such as despreading the received signal by a wideband code division multiple access (W-CDMA) method.

A signal from the control unit 906 is transferred via the switch unit 905, the baseband unit 915 and the transmitter 913 and amplified by the amplifier unit 911. Then, the signal is transmitted to the UE from the transmitting antenna 901. In this case, the baseband unit 915 performs a baseband signal process, such as spreading the transmitting signal by the W-CDMA method and the like. The transmitter 913 performs digital-to-analog (D/A) conversion and conversion to a radio frequency (RF) signal.

The control unit 906 includes a call process control unit 916, a supervisory control unit (SV) 917 and an interface (IF) 918. The call process control unit 916 performs radio channel control, physical line (Iub line) control, quality control and the like. The supervisory control unit 917 monitors and controls a device state, and the interface 918 terminates an Iub line between a BTS and an RNC. The call process control unit 916 instructs the baseband unit 915 to transmit the SIB received from the base station control unit to UE.

FIG. 10 shows an example of the configuration of a mobile station device. This mobile station device comprises an antenna 1001, an RF unit 1002, a baseband unit 1003, an audio input/output unit 1004 (Speaker & Mic.), a call process control unit 1005 and a storage unit 1006.

The RF unit 1002 includes an antenna duplexer (DUP) 1011, a power amplifier unit (PA) 1012, a receiver (RX) 1013, a transmitter (TX) 1014, a conversion unit 1015 (Analog Front End) and a frequency synthesizer 1016.

The baseband unit 1003 includes a signal process unit 1017 (L1 Modem & CH codec), a control unit 1018 (Baseband & RF control) and an audio interface 1019.

A signal transmitted from a BTS is received by the antenna 1001 and transferred to the baseband unit 1003 via the antenna duplexer 1011, the receiver 1013 and the conversion unit 1015. In this case, the receiver 1013 detects the received signal, the conversion unit 1015 performs A/D conversion and the baseband unit 1003 performs a baseband signal process, such as despreading the received signal and the like, by the W-CDMA method. Then the audio signal is outputted to the audio input/output unit 1004 from the audio interface 1019.

The audio signal from the audio input/output unit 1004 is inputted to the audio interface 1019 and transferred as a transmitting signal via the baseband unit 1003, the conversion unit 1015 and the transmitter 1014. Then, the signal is amplified by the power amplifier unit 1012 and is transmitted to the BTS from the antenna 1001 via the antenna duplexer 1011. In this case, the baseband unit 1003 performs a baseband signal process, such as spreading the transmitting signal by the W-CDMA method and the like, the conversion unit 1015 performs D/A conversion and the transmitter 1014 converts the transmitting signal to an RF signal using the output of the frequency synthesizer 1016.

The call process control unit 1005 includes radio channel control, quality control, mobility control and the like. The call process control unit 1005 also stores the SIB information received from the BTS in the storage unit 1006 and controls cell selection using various parameters, such as HCS structure information and the like.

Next, the specific examples of the above-described methods A-F are described with reference to FIGS. 11 through 27. Although in the specific example, the following presumptions are used, the application range of the present invention is not limited by these presumptions.

The numerical range of the priority level of an HCS cell is 0 through 7.

The priority level of a cell that UE currently visits is "4".

While measuring the number of times of cell reselections, UE executes cell reselection between cells with the same priority levels.

(1) Method A

Parameters needed for UE to control cell selection are reported using the SIB shown in FIGS. 2-4. Of these, the parameter 44 in the element 40 shown in FIG. 3 is modified as shown in FIG. 11 in order to realize the method A. In this case, the threshold value $N_{CR}$-i (i=0, 1, ... , 7) of the number of times of cell reselections is set for each priority level and for measurement time $T_{CRMAX}$ and the threshold value $N_{CR}$-i, the values shown in FIG. 12 are used.

FIG. 13 shows the cell transfer conditions of UE in the case where the parameter values shown in FIG. 12 are used. For example, if the number of times of reselections executed during measurement time $T_{CRMAX}$ (120 seconds) is more than $N_{CR}$-0 (15), a transfer target priority level becomes "0". If the number of times of reselections executed during measurement time $T_{CRMAX}$ (120 seconds) is equal to or more than $N_{CR}$-1 and less than $N_{CR}$-0 (12~14), a transfer target priority level becomes "1". If the number of times of reselections is equal to or more than $N_{CR}$-7 and less than $N_{CR}$-6 (0 or 1), a transfer target priority level becomes "7".

FIG. 14 is the flowchart of the cell selecting operation by the method A. It is assumed that UE obtains the parameters shown in FIG. 12 from the received SIB and stores it in the storage unit 1006 in advance.

In a waiting state (step 1401), the call process control unit 1005 firstly activates a timer for measuring measurement time $T_{CRMAX}$ and starts counting the number of times of cell reselections (step 1402). Then, it is checked whether cell reselection has been executed (step 1403) and the number of times of cell reselections is counted up every time cell reselection has been executed (step 1404). Then, the count-up of the number of times of cell reselections is repeated until the timer value reaches $T_{CRMAX}$ (1405).

When the timer value has reached $T_{CRMAX}$, a control variable i for indicating a priority level is set to 0 (step 1406) and the number of times of cell reselections is compared with $N_{CR}$-i (step 1407). If the number of times of cell reselections is equal to or more than $N_{CR}$-i, UE enters a waiting state in a cell having a priority level "i" (step 1408).

If the number of times of cell reselections is less than $N_{CR}$-i, i is incremented by 1 (step 1409) and i is compared with the maximum value 7 of a priority level (step 1410). If i is not 7, the operations in step 1407 and after are repeated. If is 7, UE enters the waiting state in a cell having a priority level "7" (step 1411).

(2) Method B

Parameters needed for UE to control cell selection are reported using the SIB shown in FIGS. 2-4. Of these, the element 40 shown in FIG. 3 is modified as shown in FIG. 15 in order to realize the method B. In this case, besides measurement time $T_{CRMAX}$ common to each priority level, a threshold value $T_{CR}$-i (i=0, 1, ... , 7) of measurement time is set for each priority level, and for the threshold value $T_{CR}$-i of measurement time and the threshold value $N_{CR}$ of the number of times of cell reselections, for example, the values shown in FIG. 16 are used.

FIG. 17 shows the cell transfer conditions of UE in the case where the parameter values shown in FIG. 16 are used. For example, if time T required for the number of times of cell reselections to reach $N_{CR}$ (8) is equal to or less than $T_{CR}$-0 (64 seconds), the transfer target priority level becomes "0". If T is longer than $T_{CR}$-0 and equal to or less than $T_{CR}$-1 (longer than 64 seconds and equal to or less than 80 seconds), the transfer target priority level becomes "1". If T is longer than $T_{CR}$-6 (480 seconds), the transfer target priority level becomes "7".

FIG. 18 is the flowchart of the cell selecting operation by the method B. It is assumed that UE obtains the parameters shown in FIG. 16 from the received SIS and stores it in the storage unit 1006 in advance.

In a waiting state (step 1801), the call process control unit 1005 firstly activates a timer for measuring measurement time $T_{CRMAX}$ and starts counting the number of times of cell reselections (step 1802). Then, it is checked whether cell reselection has been executed (step 1803) and the number of times of cell reselections is counted up every time cell reselection has been executed (step 1804). Then, the count-up of the number of times of cell reselections is repeated until the timer value reaches $T_{CRMAX}$ (1805).

When the number of times of cell reselections has reached $N_{CR}$, time T elapsed since the start of the count is recorded (step 1806). Then, a control variable i for indicating a priority level is set to 0 (step 1807) and T is compared with $T_{CR}$-i (step 1808). If T is equal to or less than $T_{CR}$-i, UE enters the waiting state of a cell having a priority level "i" (step 1809).

If T is longer than $T_{CR}$-i, i is incremented by 1 (step 1812) and i is compared with the maximum value 7 of a priority level (step 1813). If i is not 7, the operations in step 1808 and after are repeated. If i is 7, UE enters a waiting state in a cell having a priority level "7" (step 1814).

If in step 1803 cell reselection is not executed, the timer value is compared with $T_{CRMAX}$ (step 1810). If the timer value is less than $T_{CRMAX}$, the operations in step 1803 and after are repeated. If the timer value has reached $T_{CRMAX}$, UE enters the waiting state in a cell having a priority level "7" (step 1811).

(3) Method C

Parameters needed for UE to control cell selection are reported using the SIB shown in FIGS. 2-4. Of these, the element 40 shown in FIG. 3 is modified as shown in FIG. 19 in order to realize the method C. In this case, besides measurement time $T_{CRMAX}$ and a threshold value $N_{CR}$ of the number of times of cell reselections common to each priority level, the threshold value $T_{CR}$-i of measurement time and the threshold value $N_{CR}$-i (i=0, 1, . . . , 7) of the number of times of cell reselections, for each priority level is set. For the measurement time $T_{CRMAX}$ and threshold values $T_{CR}$-i, $N_{CR}$ and $N_{CR}$-i, for example, the values shown in FIG. 18 are used.

FIG. 21 shows the cell transfer conditions of UE in the case where the parameter values shown in FIG. 20 are used. As described above, if the priority level of a cell that UE currently visits is "4", the parameter values shown in the transfer target priority levels "0" through "3" of FIG. 21 are used when it enters a cell (large cell) having a lower priority level than it.

In this case, firstly, it checks whether reselection occurs $N_{CR}$ (8) times until the timer value reaches $T_{CRMAX}$ (120 seconds). If the number of times of reselections reaches 8 during the time period, it determines a transfer target cell at that time point. The priority level of the transfer target cell is determined by time T elapsed before the number of times of reselections reaches 8.

For example, if T is equal to or less than $T_{CR}$-0 (64 seconds), the transfer target priority level becomes "0". If T is longer than $T_{CR}$-0 and equal to or less than $T_{CR}$-1 (longer than 64 seconds and equal to or less than 80 seconds), the transfer target priority level becomes "1".

If the number of times of reselections does not reach 8 even after 120 seconds have elapsed, the cell selection logic of a priority level higher than "4" being the priority level of a cell that UE currently visits is used. In this case, the parameter values shown in the transfer target priority levels "4" through "7" of FIG. 21 are used and the priority level of a transfer target cell is determined by the number of times of reselections caused before 120 seconds elapse.

For example, if the number of times of reselections caused during 120 seconds is equal to or more than $N_{CR}$-6 and less than $N_{CR}$-5 (2 or 3), the transfer target level becomes "6". If the number of times of reselections is equal to or more than $N_{CR}$-7 and less than $N_{CR}$-6 (0 or 1), the transfer destination level becomes "7".

FIG. 22 is the flowchart of the cell selecting operation by the method C. It is assumed that UE obtains the parameters shown in FIG. 20 from the received SIB and stores it in the storage unit 1006 in advance.

Operations in steps 2201-2209 shown in FIG. 22 are the same as those in steps 1801-1809 shown in FIG. 18. In step 2208, if T is longer than $T_{CR}$-1, the call process control unit 1005 increments i by 1 (step 2210) and compares i with "3" of a priority level, which is lower than the priority level "4" of a visited cell by 1 (step 2211). If i is not 3, the operations in steps in 2208 and after are repeated. If i is 3, UE enters the waiting state in a cell having a priority level "3" (step 2212).

If in step 2203 no cell reselection is executed, the timer value is compared with $T_{CRMAX}$ (step 2213). If the timer value is less than $T_{CRMAX}$, the operations in steps 2203 and after are repeated. When the timer value reaches $T_{CRMAX}$, the priority level "4" of a visited cell is set in a control variable ii for indicating a priority level (step 2214) and the number of times of cell reselections is compared with $N_{CR}$-ii (step 2215). If the number of times of cell reselections is equal to or more than $N_{CR}$-ii, UE enters the waiting state in a cell having a priority level "ii" (step 2216).

If the number of times of cell reselections is less than $N_{CR}$-ii, ii is incremented by 1 (step 2217) and the ii is compared with the maximum value 7 of the priority level (step 2218). If is not 7, the operations in steps 2215 and after are repeated. If i is 7, UE enters the waiting state in a cell having a priority level "7".

(4) Method D

Parameters needed for UE to control cell selection are reported using the SIB shown in FIGS. 2-4. In the method D, for example, UE visiting an area where the SIB of the method A is reported can also select using the method A. Alternatively, the UE can determine the state of its own station, calculate cell transfer conditions different from those of the method A and select a transfer target cell suitable for its own station. Here, a case where UE receives the same SIB as the method A and calculates the same cell transfer conditions as those of the method C is described.

In this case, for the HCS structure information of SIB, the same information as shown in FIG. 11 is used, and for measurement time $T_{CRMAX}$ and the threshold value $N_{CR}$-i of the number of times of cell reselections, for example, the values shown in FIG. 23 (the same as shown in FIG. 12) are used. The call process control unit 1005 calculates the cell transfer conditions of its own station according to the following logic.

1. Average time per time of cell reselection for each $N_{CR}$-i is calculated by calculating $T_{CRMAX}/N_{CR}$-i.

$N_{CR}$-7: 120/0> It is determined as 0 seconds/time
$N_{CR}$-6: 120/2=60 seconds/time
$N_{CR}$-5: 120/4=30 seconds/time
$N_{CR}$-4: 120/6=20 seconds/time
$N_{CR}$-3: 120/8=15 seconds/time
$N_{CR}$-2: 120/10=12 seconds/time
$N_{CR}$-1: 120/12=10 seconds/time
$N_{CR}$-0: 120/15=8 seconds/time 2. The threshold value $N_{CR}$ of the number of times of reselections in the case where UE enters a cell having a priority level lower than that of a visited cell is calculated.

Since UE visits a cell having a priority level "4" according to the presumptions, the threshold value $N_{CR}$-3 (8) of a priority level "3" being lower by 1 than its priority level is specified as its $N_{CR}$.

3. For each transfer target priority level "i", average time needed to execute $N_{CR}$ (8) times of cell reselections is calculated on the basis of the result of the above 1. Thus, the same threshold value $T_{CR}$-i (i=0, 1, 2 and 3) as shown in FIG. 20 is obtained and the same cell transfer conditions as shown in FIG. 21 are set using $T_{CR}$-i.

NCR-3: 15 seconds/time×8 times=120 seconds>TCR-3
NCR-2: 12 seconds/time×8 times=96 seconds>TCR-2
NCR-1: 10 seconds/time×8 times=80 seconds>$T_{CR}$-1
NCR-0: 8 seconds/time×8 times=64 seconds>$T_{CR}$-0

4. When UE enters a cell having a higher priority level than that of a visited cell, the transfer target priority level is determined by the number of times of cell reselections when measurement time reaches $T_{CRMAX}$ (120 seconds).

In this case, the same cell transfer conditions as shown in FIG. 21 are set using $N_{CR}$-i (i=4, 5, 6 and 7).

Figure 24:
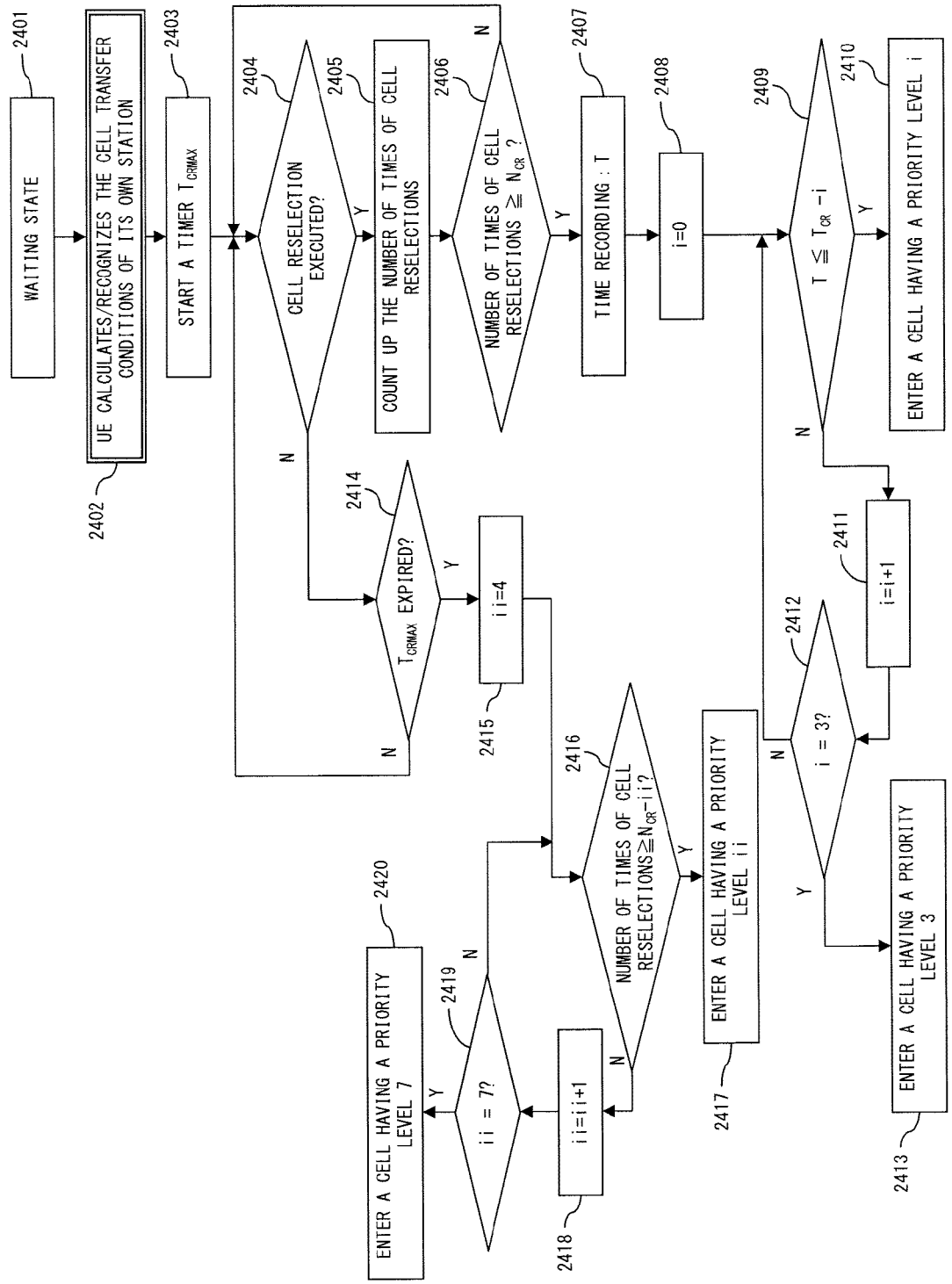
FIG. 24 is the flowchart of a cell selecting operation by the method D.

FIG. 24 is the flowchart of the cell selecting operation by the method D. It is assumed that UE obtains the parameters shown in FIG. 23 from the received SIB and stores it in the storage unit 1006 in advance.

In a waiting state (step 2401), the call process control unit 1005, firstly, calculates the same parameters as shown in FIG. 20 according to the logic described in the above 1 through 4 and stores them in the storage unit 1006 (step 2402). Then, in steps 2403-2420, the same operations as those in steps 2202-2219 shown in FIG. 22 are performed.

(5) The method E

When the cell transfer by each of the above-described methods A-D fails, UE determines a cell having a priority level closest to the priority level of the transfer target cell as its new transfer target and performs re-transfer process. For example, the re-transfer process in the case where the cell transfer by the method A fails becomes as shown in FIG. 25.

In a waiting state (step 2501), the call process control unit 1005, firstly, performs the operation shown in FIG. 14 and selects a cell by the method A (step 2502). Then, UE enters the waiting state in the selected cell (step 2503).

Then, the receiving level in the transfer target cell is compared with a threshold value $Q_{hcs}$ obtained from SIB (step 2504) If the receiving level is higher than $Q_{hcs}$, waiting control (3GPP) in the cell is performed (step 2507).

If the receiving level is equal to or lower than $Q_{hcs}$, then the priority level of the transfer target cell and that of the cell before transfer are compared (step 2505). If the priority level of the transfer target cell is higher that of the cell before transfer, 1 is added to the priority level of the transfer target cell and a cell having the same priority level as the addition result is selected as a re-transfer target. Then, UE enters the waiting state in the cell (step 2506).

If the priority level of the transfer target cell is lower than that of the cell before transfer, 1 is reduced from the priority level of the transfer target cell and a cell having the same priority level as the reduction result is selected as a re-transfer target. Then, UE enters the waiting state in the cell (step 2508).

Then, in the waiting state in the re-transfer target cell, the operations in steps 2504 and after are repeated.

A re-transfer process in the case where cell transfer by each of the methods B-D fails is the same as shown in FIG. 25.

(7) Method F

When the cell transfer by each of the above-described methods A-D fails, UE determines a cell having a priority level that is away by a prescribed value from the priority level of the transfer target cell as its new transfer target and performs re-transfer process.

For example, when the above prescribed value in the method F is reported using the SIB shown in FIG. 4, as shown in FIG. 26, parameters 2601 and 2602 are added to the SIB. A re-transfer process in the case where cell transfer by the method A fails becomes as shown in FIG. 27.

Figure 27:
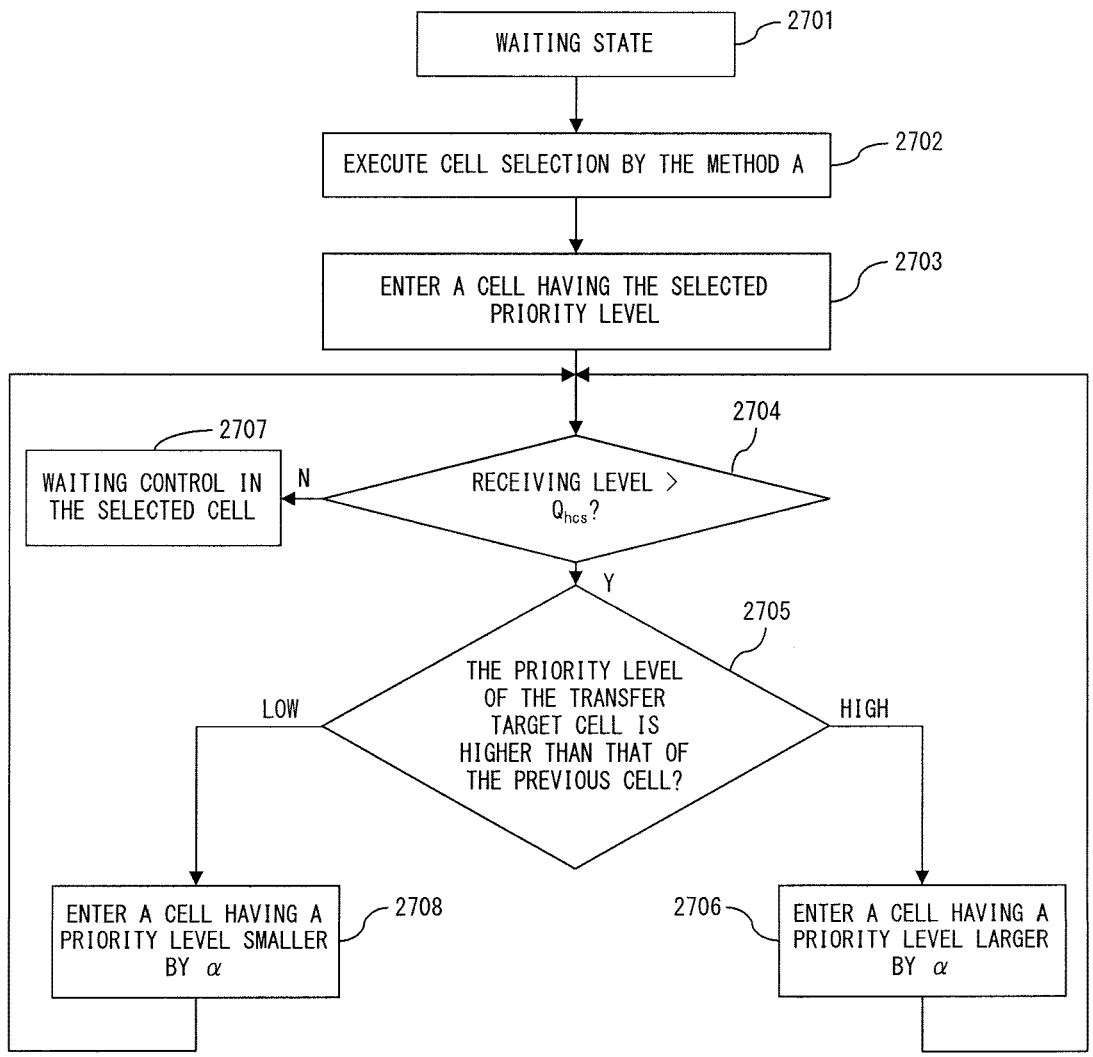
FIG. 27 is the flowchart of a re-transfer process by a method F.

Operations in steps 2701-2705 and 2707 shown in FIG. 27 are the same as those in steps 2501-2505 and 2507 shown in FIG. 25. If in step 2705 the priority level of the transfer target cell is higher than that of the cell before transfer, the call process control unit 1005 adds a prescribed value α specified by the parameter 2601 to the priority level of the transfer target cell and selects a cell having the same priority level as the addition result as a re-transfer target. Then, UE enters the waiting state in the cell (step 2706).

If the priority level of the transfer target cell is lower than that of the cell before transfer, a prescribed value-α specified by the parameter 2602 to the priority level of the transfer target cell and a cell having the same priority level as the addition result is selected as a re-transfer target. Then, UE enters the waiting state in the cell (step 2708).

Then, in the waiting state in the re-transfer target cell, the operations in steps 2704 and after are repeated.

In this case, there is no need that the absolute value of the prescribed value specified by the parameter 2601 and the absolute value of the prescribed value specified by the parameter 2602 are the same.

A re-transfer process in the case where cell transfer by each of the methods B-D fails is the same as shown in FIG. 27.

According to the re-transfer process of the methods E and F, even when transfer to a selected cell fails, UE can enter a cell having priority fairly close to that of the cell.

What is claimed is:

1. A mobile communication system adopting a hierarchical cell structure consisting of a plurality of layers having respective cells of different sizes, wherein a radio control device and a radio base station device constituting the system notify a mobile station device required to move between the hierarchical cells of information of a plurality of threshold values of a number of times of cell reselections set for respective layers of the plurality of layers, and the mobile station device receives the information of the plurality of threshold values, measures a number of times of cell reselections executed in a specific time, compares an obtained number of times of cell reselections with each of the plurality of threshold values, determines a layer suitable for the moving speed, selects a cell which belongs to a determined layer as a transfer target and enters a waiting state.

2. A mobile station device for selecting a cell to visit according to a moving speed in a mobile communication system adopting a hierarchical cell structure consisting of a plurality of layers having respective cells of different sizes, the mobile station device comprising:

a storage unit configured to store a plurality of threshold values of a number of times of cell reselections set for respective layers of the plurality of layers; and a controller configured to measure a number of times of cell reselections executed in a specific time, to compare an obtained number of times of cell reselections with each of the plurality of threshold values, to determine a layer suitable for the moving speed and to select a cell which belongs to a determined layer as a transfer target.

3. The mobile station device according to claim 2, wherein
if the number of times of cell reselections is equal to or more than a threshold value corresponding to a first layer and less than a threshold value corresponding to a second layer having a larger cell than the first layer, the controller selects the first layer as the layer suitable for the moving speed.

4. The mobile station device according to claim 2, wherein the storage unit further stores a plurality of threshold values of cell reselection number measurement time set for the respective layers of the plurality of layers and
if the number of times of cell reselections is equal to or more than a threshold value corresponding to a first layer and less than a threshold value corresponding to a second layer having a larger cell than the first layer when selecting a cell for a purpose of entering a larger cell than a currently visited cell, the controller selects the first layer as the layer suitable for the moving speed and
if the mobile station device selects a cell for a purpose of entering a cell smaller than a currently visited cell, the controller measures a time required for a number of times of executed cell reselections to reach a specific value, compares an obtained required time with each of the plurality of threshold values of cell reselection number measurement time and selects a third layer as the layer suitable for the moving speed if the required time is equal to or shorter than a threshold value corresponding to the third layer and longer than a threshold value corresponding to a fourth layer having a larger cell than the third layer.

5. The mobile station device according to claim 4, wherein the controller calculates the plurality of threshold values of cell reselection number measurement time by using the plurality of threshold values of number of times of cell reselections and the specific time and stores the plurality of threshold values in the storage unit.

6. The mobile station device according to claim 2, wherein when transfer to the cell belonging to the determined layer fails, the controller selects a cell belonging to a layer having priority closest to priority of the layer of the cell as a re-transfer target.

7. The mobile station device according to claim 2, wherein when transfer to the cell belonging to the determined layer fails, the controller selects a cell belonging to a layer having priority away by a prescribed value from priority of the layer of the cell as a re-transfer target.

8. The mobile station device according to claim 2, further comprising
a receiver configured to receive the plurality of threshold values from a radio mobile communication network as annunciation information.

9. A mobile station device for selecting a cell to visit according to a moving speed in a mobile communication system adopting a hierarchical cell structure consisting of a plurality of layers having respective cells of different sizes, the mobile station device comprising:
a storage unit configured to store a plurality of threshold values of cell reselection number measurement time set for respective layers of the plurality of layers; and
a controller configured to measure a time required for a number of times of executed cell reselections to reach a specific value, to compare an obtained required time with each of the plurality of threshold values, to determine a layer suitable for the moving speed and to select a cell belonging to a determined layer as a transfer target.

10. The mobile station device according to claim 9, wherein
if the required time is equal to or shorter than a threshold value corresponding to a first layer and longer than a threshold value corresponding to a second layer having a larger cell than the first layer, the controller selects the first layer as the layer suitable for the moving speed.

11. The mobile station device according to claim 9, wherein
when transfer to the cell belonging to the determined layer fails, the controller selects a cell belonging to a layer having priority closest to priority of the layer of the cell as a re-transfer target.

12. The mobile station device according to claim 9, wherein
when transfer to the cell belonging to the determined layer fails, the controller selects a cell belonging to a layer having priority away by a prescribed value from priority of the layer of the cell as a re-transfer target.

13. The mobile station device according to claim 9, further comprising
a receiver configured to receive the plurality of threshold values from a radio mobile communication network as annunciation information.

14. A cell selection method for selecting a cell to visit according to a moving speed in a mobile communication system adopting a hierarchical cell structure consisting of a plurality of layers having respective cells of different sizes, the cell selection method comprising:
measuring a number of times of cell reselections executed in a specific time;
comparing an obtained number of times of cell reselections with each of the plurality of threshold values set for respective layers of the plurality of layers and determining a layer suitable for the moving speed; and
selecting a cell belonging to a determined layer as a transfer target.

15. The cell selection method according to claim 14, wherein
if the number of times of cell reselections is equal to or more than a threshold value corresponding to a first layer and less than a threshold value corresponding to a second layer having a larger cell than the first layer, the first layer is selected as the layer suitable for the moving speed.

16. The cell selection method according to claim 14, wherein
if the number of times of cell reselections is equal to or more than a threshold value corresponding to a first layer and less than a threshold value corresponding to a second layer having a larger cell than the first layer when selecting a cell for a purpose of entering a larger cell than a currently visited cell, the first layer is selected as the layer suitable for the moving speed, and
when selecting a cell for a purpose of entering a smaller cell than a currently visited cell, a time required for a number of times of executed cell reselections to reach a specific value is measured, an obtained required time is compared with each of a plurality of threshold values of cell reselection number measurement time set for the respective layers of the plurality of layers and if the required time is equal to or shorter than a threshold value corresponding to a third layer and longer than a threshold value corresponding to a fourth layer having a larger cell than the third layer, the third layer is selected as the layer suitable for the moving speed.

17. A mobile communication system adopting a hierarchical cell structure consisting of a plurality of layers having respective cells of different sizes, wherein
a radio control device and a radio base station device constituting the system notify a mobile station device required to move between the hierarchical cells of information of a plurality of threshold values of cell reselection number measurement time set for respective layers of the plurality of layers, and
the mobile station device receives the information of the plurality of threshold values, measures a time required for a number of times of executed cell reselections to reach a specific value, compares an obtained required time with each of the plurality of threshold values, determines a layer suitable for the moving speed, selects a cell which belongs to a determined layer as a transfer target and enters a waiting state.

18. A mobile communication system for communicating in a hierarchical cell structure having a plurality of layers, the system comprising:
a radio base station device configured to transmit information on a plurality of threshold values that vary according to respective layers of the plurality of layers; and
a mobile station device configured to receive the information on the plurality of threshold values that vary according to the respective layers, measure a number of times of cell reselections executed in a given time period, compare the measured number of times of cell reselections with each of the plurality of threshold values, select a layer associated with the threshold value suitable for the measured number of times, and select a cell which belongs to the selected layer as a transfer target.

* * * * *